United States Patent
Kreuter et al.

(10) Patent No.: US 11,324,087 B1
(45) Date of Patent: May 3, 2022

(54) DRIVER USING SAFETY INFORMATION

(71) Applicant: Infineon Technologies AG, Neubiberg (DE)

(72) Inventors: Hans-Peter Kreuter, Villach (AT); Christof Michenthaler, Feistritz/Gail (AT); Franco Mignoli, Verona (IT); Salvatore Sanna, Padua (IT); Alfonso Nasciuti, Parma (IT); Andrea Scenini, Montegrotto Terme (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/132,255

(22) Filed: Dec. 23, 2020

(51) Int. Cl.
*H05B 45/30* (2020.01)
*H05B 47/18* (2020.01)
*H05B 45/14* (2020.01)
*H05B 45/54* (2020.01)
*G05B 19/042* (2006.01)

(52) U.S. Cl.
CPC ......... *H05B 45/14* (2020.01); *G05B 19/0428* (2013.01); *H05B 45/54* (2020.01); *H05B 47/18* (2020.01); *G05B 2219/24024* (2013.01)

(58) Field of Classification Search
CPC ........ H05B 45/00; H05B 45/10; H05B 45/14; H05B 45/30; H05B 47/18; G05B 19/0423; G05B 19/0425; G05B 19/0428; G05B 2219/24024; H04L 2012/40267; H04L 2012/40273
See application file for complete search history.

(56) References Cited

U.S. PATENT DOCUMENTS

| | | | | |
|---|---|---|---|---|
| 9,629,221 | B2* | 4/2017 | Saes | H05B 47/18 |
| 2013/0318263 | A1 | 11/2013 | Heiling et al. | |
| 2016/0226236 | A1* | 8/2016 | Djelassi | H02H 7/261 |
| 2017/0111969 | A1* | 4/2017 | Zhao | H05B 47/16 |
| 2017/0163366 | A1 | 6/2017 | Aichriedler | |
| 2019/0132929 | A1* | 5/2019 | Sturm | H05B 47/18 |
| 2019/0353336 | A1* | 11/2019 | Kreuter | H05B 45/30 |

OTHER PUBLICATIONS

Texas Instruments, "TPS929120-Q1 12-Channel Automotive 40-V High-Side LED Driver with FlexWire", Datasheet, SLVSE03B, Feb. 2021, p. 168.
Texas Instruments, "TPS92662-Q1 High-Brightness LED Matrix Manager for Automotive Headlight Systems", Datasheet, SLUSD15B, Jun. 2020, p. 12.

* cited by examiner

*Primary Examiner* — Thai Pham
(74) *Attorney, Agent, or Firm* — Shumaker & Sieffert, P.A.

(57) ABSTRACT

A method for driving a set of light emitting diodes (LEDs) may include receiving a write access frame by a driver via a bus configured for connection with a controller and the driver. The write access frame includes brightness information. The method may further include controlling, by the driver, the set of LEDs based on the brightness information and determining, by the driver, safety information while controlling the set of LEDs based on the brightness information. The method may further include outputting, by the driver and at the bus, the safety information to acknowledge receipt of the write access frame.

20 Claims, 9 Drawing Sheets

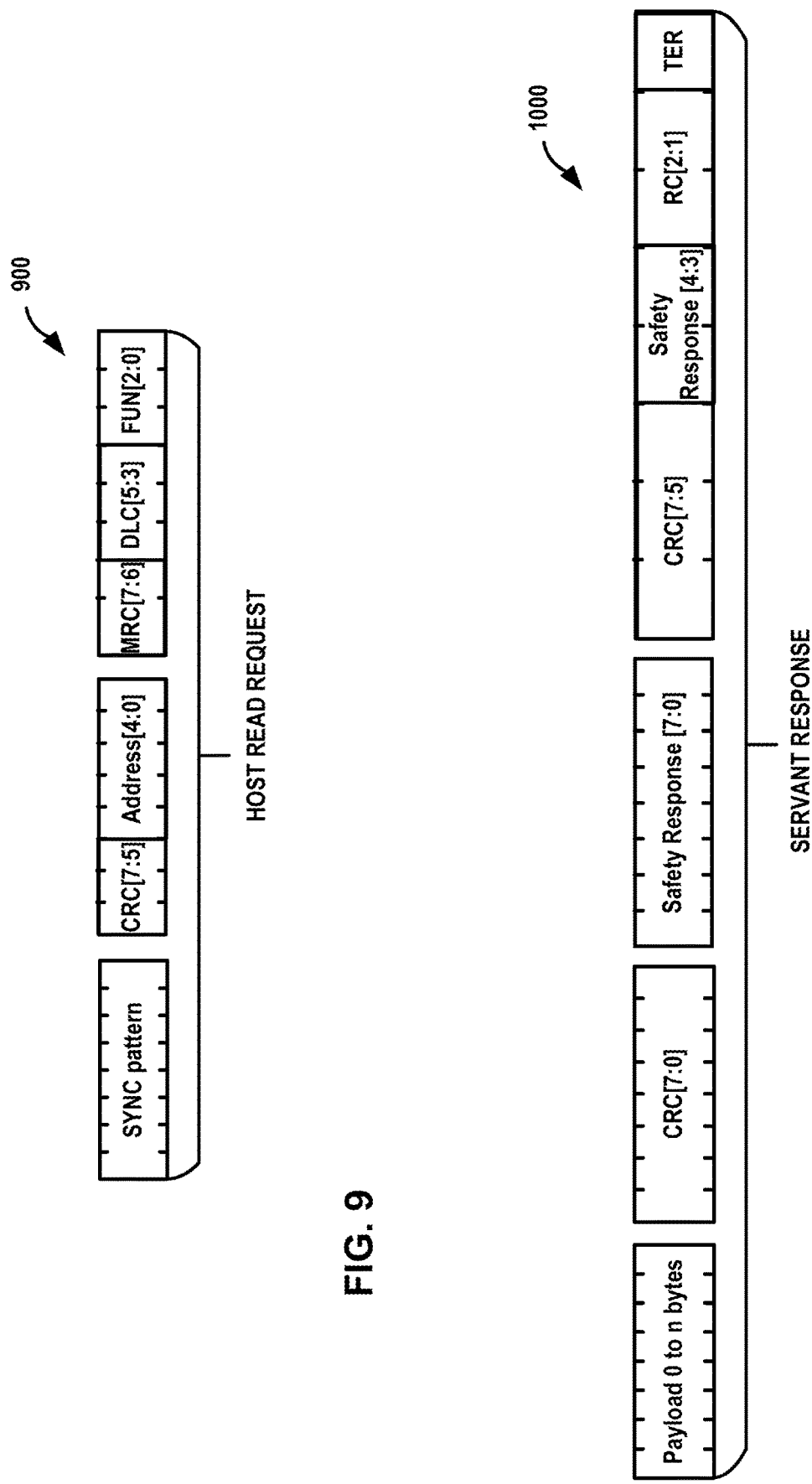

000# DRIVER USING SAFETY INFORMATION

TECHNICAL FIELD

This disclosure relates a driver, such as a light emitting diode (LED) driver, that is configured to control a voltage, a current, or a power supplied to a load, such as a string of LEDs.

BACKGROUND

Drivers may control a voltage, a current, or a power at a load. For instance, a light emitting diode (LED) driver may control a power supplied to a string of light emitting diodes. Some drivers may include a DC to DC converter, such as a buck-boost, buck, boost, or another DC to DC converter. Such DC to DC converters may change the power at the load based on a characteristic of the load.

SUMMARY

In general, this disclosure is directed to techniques for communication between a controller and a driver. The controller may comprise, for example, a host, a microcontroller, an electronic control unit (ECU), or another controller. The driver may be configured to drive one or more light emitting diodes (LEDs). For example, a driver may receive a write access frame from a controller via a bus. Moreover, the write access frame may include brightness information that indicates parameters (e.g., a current or duty cycle) associated with a brightness of a set of LEDs being driven by the driver. The driver may control the set of LEDs based on the brightness information and determine safety information while controlling the set of LEDs based on the brightness information. To acknowledge receipt of the write access frame, the driver may output safety information to the controller via the bus. The safety information may indicate whether the driver and/or set of LEDs is operating in a safe condition. For instance, the safety information may include undervoltage information, current warning information, forward voltage warning information, duty cycle warning information, short circuit warning information, transmission error feedback information, overloaded LED warning information, and/or device fault feedback information.

Rather than relying on communication protocols with relatively low data rates (e.g., less than 20 kbit/s) and/or complex communication protocols (e.g., using a host arbitration process), techniques described herein may configure a driver and/or a controller to acknowledge a change in brightness information for a set of LEDs using safety information. In this way, the driver and/or the controller may reduce a complexity of the driver and/or controller while permitting relatively high data rates.

Moreover, the use of safety information as an acknowledgement of receipt of a write access frame may reduce a network utilization of a bus and help to ensure safety in the system. For example, a write access frame to provide brightness information, an acknowledgement for the write access frame, a read access frame to determine safety information, and an acknowledgement for the read access frame may be reduced using techniques described herein to a single write access frame with safety information used as an acknowledgement. In this way, the techniques described herein using safety information as an acknowledgement may reduce the network utilization of the bus while potentially providing safety information faster than systems that do not acknowledge using safety information.

Further, a communication protocol using safety information as an acknowledgement of receipt of a write access frame may be configured for a single host, which may permit a bus to use access frames that omit arbitration fields and further simplify the implementation of the communication protocol at the driver and/or controller.

In one example, a method for driving a set of LEDs includes receiving a write access frame by a driver via a bus configured for connection with a controller and the driver. The write access frame includes brightness information. The method further includes controlling, by the driver, the set of LEDs based on the brightness information and determining, by the driver, safety information while controlling the set of LEDs based on the brightness information. The method further includes outputting, by the driver and at the bus, the safety information to acknowledge receipt of the write access frame.

In another example, a device for driving a set of LEDs includes a driver configured to receive a write access frame via a bus configured for connection with a controller and the driver. The write access frame includes brightness information. The driver is further configured to control the set of LEDs based on the brightness information and determine safety information while controlling the set of LEDs based on the brightness information. The driver is further configured to output, at the bus, the safety information to acknowledge receipt of the write access frame.

In another example, a system for controlling LEDs includes an electronic control unit (ECU), a driver, and a bus. The driver is configured to drive a set of LEDs. The bus is configured for connection with the ECU and the driver. The ECU is configured to output a write access frame at the bus. The write access frame includes brightness information. The driver is configured to receive the write access frame via the bus and control the set of LEDs based on the brightness information of the write access frame. The driver is further configured to determine safety information while controlling the set of LEDs based on the brightness information of the write access frame and output, at the bus, the safety information to acknowledge receipt of the write access frame.

Details of these and other examples are set forth in the accompanying drawings and the description below. Other features, objects, and advantages will be apparent from the description and drawings, and from the claims.

BRIEF DESCRIPTION OF DRAWINGS

FIG. 9 is a timing diagram of example read access frame for performing a read operation, in accordance with one or more techniques of this disclosure.

FIG. 10 a timing diagram of example servant response to a read access frame for performing a read operation, in accordance with one or more techniques of this disclosure.

DETAILED DESCRIPTION

Figure 1:
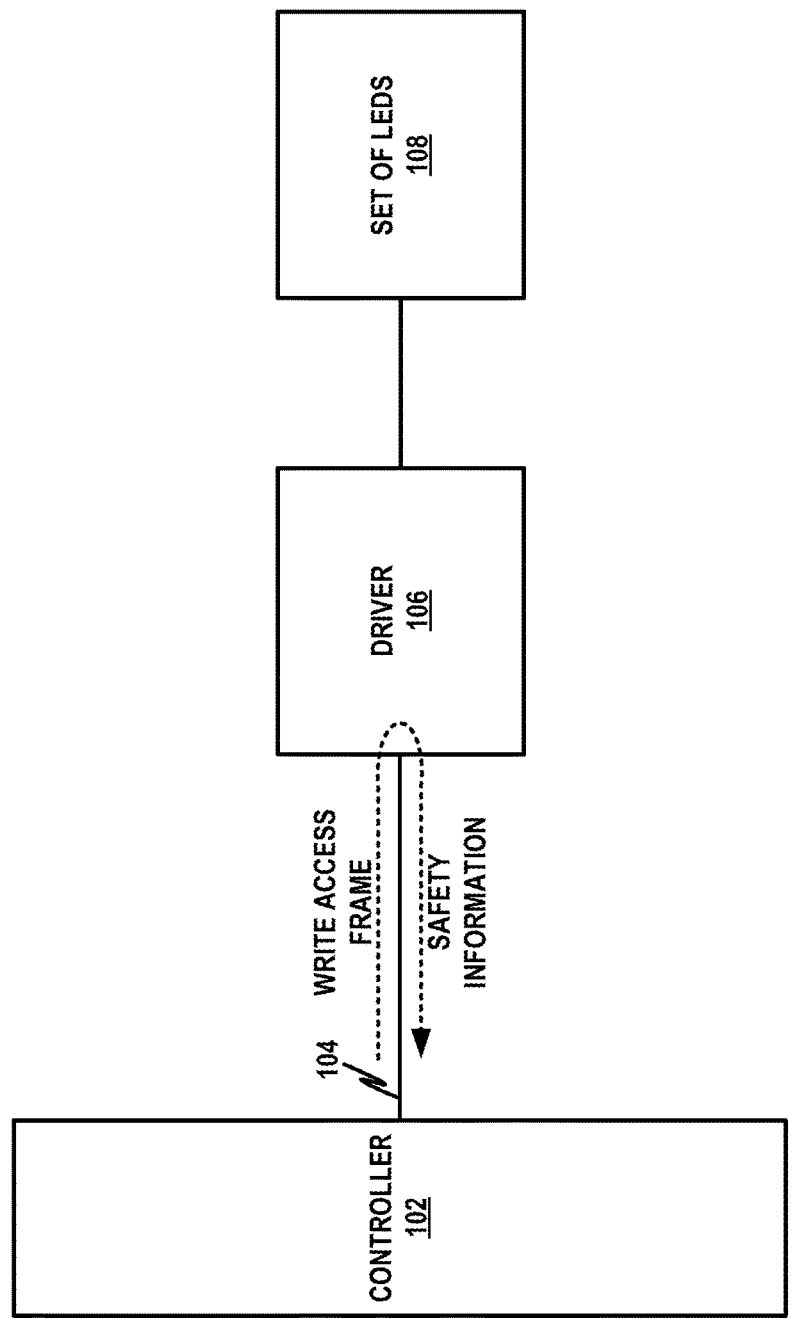
FIG. 1 is a block diagram illustrating an example system configured for controlling a light emitting diodes, in accordance with one or more techniques of this disclosure.

Techniques described herein may be applied to systems comprising a host and one or more servant devices. While examples described herein refer to systems to drive light emitting diodes (LEDs), some examples may additionally or alternatively drive other devices, such as for example, actuators and/or sensors.

Some automotive systems may use "smart" LED solutions to replace bulbs and high-intensity discharge (HID) lamps for front, interior, and/or rear lighting. The smart LED solutions may include linear current sources with integrated protection and diagnosis circuitry. In addition some industrial LED applications, such as, for example, architectural LED lighting, LED stripes or even emergency lighting (e.g., exit way signs) may benefit from the use of smart LED solutions.

For example, an electronic control unit (ECU) may be used to supply and control remote LED modules. In a first example setup, the LED module itself may be equipped with LEDs and current limiting components (e.g. resistors or transistors). In a second setup (e.g., a first smart LED solution), the LED module may be equipped with LEDs and smart LED driver ICs (e.g. linear current sources with integrated protection and diagnosis). The example first and second setups may use one wire per function. Consequently, the first and second setups may use a supply wire to both enable and disable the function. The first and second setups may maintain diagnostic feedback by the resulting LED current or voltage only, where a current or voltage measurement unit on the ECU side is used.

In an example third setup (e.g., a second smart LED solution), the LED module may be equipped with LEDs, smart LED driver ICs, a communication interface, and one or more microcontroller units for functions, such as, for example dynamic activations or displaying pictograms on a LED matrix. The communication interface may include, for example, a local interconnect network (LIN) interface or controller-area network (CAN) interface. LIN may refer to protocols compliant with ISO/AWI 17987-8, other versions of LIN or newer versions of LIN. CAN may refer to protocols compliant with CAN standard ISO 11898, CAN flexible data-rate interface (CAN FD) 1.0, 2.0, other versions of CAN or newer versions of CAN. In the example third setup, the ECU (e.g., a host device) and the servant device (e.g., an LED module, an actuator, or a sensor) may communicate using the LIN interface and/or the CAN interface.

Systems using a LIN interface and microcontroller may be complex with the drawbacks of low data rates (e.g., less than 1 kbit/s or less than 20 kbit/s) and high implementation costs. Replacing the LIN interface with a CAN interface may improve the data rate. For example, the CAN interface may allow data rates of greater than 100 kbit/s, greater than 250 kbit/s, greater than 500 kbit/s, or greater than 1000 kbit/s). However, the microcontroller may use additional supply circuitry (e.g., a transceiver integrated circuit (IC)) to implement the CAN interface compared to microcontrollers that use a LIN interface. As such, implementing the CAN interface may result in high system costs compared to the LIN interface. In addition, the CAN interface may be a multi-host network, which may not be used for ECU-to-LED driver communication.

More specifically, in the CAN flexible data-rate (CAN FD) frame format, an arbitration field contains the 11-bit or 29-bit identifier, which addresses the device and defines the priority of the message. However, an ECU-to-LED driver communication protocol does use arbitration, because of the single host to multiple servant system of ECU-to-LED drivers. In addition the identifier address space can be reduced, for example to 8-bit. Moreover, the control field of the CAN FD frame format can be optimized and reduced because of the limited application space of the ECU-to-LED drivers. Further, the acknowledgement (ACK) behavior of the CAN FD frame format can be skipped, because the single host to multiple servant system of ECU-to-LED drivers may omit the mutual acknowledgement scheme.

In accordance with the techniques of the disclosure, a controller (e.g., an ECU, microcontroller, host device, etc.) and a driver (e.g., an LED driver, a servant device, a servant node, an LED module, etc.) may be configured to use a high-speed lighting bus (referred to herein as simply "bus") for LED driver applications. The controller may be a bus master. For instance, a microcontroller on the ECU can be coupled on the bus. One or more drivers can be coupled to the bus. In operation, the controller may select, configure, and request data from the one or more drivers, consequently a host-servant approach may be used.

In some examples, the controller and one or more drivers may communicate using a high speed lighting bus protocol based on a universal asynchronous receiver/transmitter (UART). Examples of protocols based on UART may include an RS232 communication protocol or another protocol based on UART. For example, the controller and one or more drivers may apply a protocol that includes an optional master break signal, a master request sync byte, a servant address, a master request rolling counter field, a master request message data length code, a master request cyclic redundancy check (CRC), a master request function selection, a master request payload section, a master request payload CRC, an optional servant response for safety related LED driver feedback, an optional servant response CRC, and an optional servant response message counter.

FIG. 1 is a block diagram illustrating an example system 100 configured for controlling LEDs, in accordance with one or more techniques of this disclosure. As illustrated in this example of FIG. 1, system 100 may include controller 102, bus 104, driver 106, and set of LEDs 108. Although system 100 illustrates one driver (e.g., driver 106) and one set of LEDs (e.g., set of LEDs 108), some examples may include more than one driver and/or more than one sets of LEDs.

Set of LEDs 108 may include any number of LEDs. In some examples, two or more LEDs of set of LEDs 108 may be coupled in a series string of LEDs. Additionally, or alternatively, two or more LEDs of set of LEDs 108 may be coupled in parallel. As used herein, an LED may refer to any semiconductor light source. In some examples, an LED may include a p-n junction configured to emit light when activated. In an example application, set of LEDs 108 may be included in an automotive vehicle. For instance, set of LEDs 108 may be a matrix of LEDs to light an interior of an automotive vehicle. In some examples, set of LEDs 108 may be associated with one or more pattern settings. For example, set of LEDs 108 may be configured to provide a first pattern or a second pattern.

Controller 102 may be configured to control driver 106 via bus 104. For example, controller 102 may output a write access frame to set an amount of current through each string of LEDs of set of LEDs 108. In some examples, controller 102 output the write access frame on bus 104 to set a duty cycle for current through each string of LEDs of set of LEDs 108. Moreover, controller 102 may monitor a status of driver 106 and/or of set of LEDs 108. For example, controller 102 may receive, via bus 104, safety information from driver 106 indicating whether current or voltage at driver 106 and/or set of LEDs 108 is unsafe. The safety information may include undervoltage information, current warning information, forward voltage warning information, duty cycle warning information, short circuit warning information, transmission error feedback information, overloaded LED warning information, and/or device fault feedback information.

Driver 106 may drive set of LEDs 108 using the write access frame output on bus 104. For example, driver 106 may determine that brightness information of the write access frame indicates a respective current through each string of a plurality of strings of LEDs of the set of LEDs 108. For instance, driver 106 may, in response to receiving, on bus 104, a write access frame including an instruction to activate set of LEDs 108 at a specified current, driver 106 may drive a power module to output a target voltage, target current, and/or target power to provide the specified current to set of LEDs 108. In some examples, driver 106 may determine brightness information of the write access frame indicates a respective duty cycle for supplying current through each string of a plurality of strings of LEDs of the set of LEDs 108. For instance, driver 106 may, in response to receiving, on bus 104, a write access frame including an instruction to activate set of LEDs 108 at a specified duty cycle, driver 106 may drive a power module to output a target voltage, target current, and/or target power to provide the specified duty cycle to set of LEDs 108.

In accordance with one or more techniques described herein, rather than relying on bus 104 to operate using a protocol (e.g., a CAN protocol or a LIN protocol) that relies on a first set of frames to provide brightness information on a bus and a second set of frames to provide safety information on the bus, system 100 may acknowledge receipt of a write access frame with the safety information.

For example, controller 102 may output, on bus 104, a write access frame that includes brightness information for set of LEDs 108. In this example, driver 106 receives the write access frame via bus 104 configured for connection with controller 102 and driver 106. The write access frame may include the brightness information, for example, as part of a payload of the write access frame. Driver 106 may control set of LEDs 108 based on the brightness information. For example, driver 106 may select a sub-set of set of LEDs 108, and provide a current and/or duty cycle to the sub-set of LEDs as specified by the brightness information.

Driver 106 may determine safety information while controlling set of LEDs 108 based on the brightness information. For example, driver 106 may determine undervoltage information indicating whether a voltage at set of LEDs 108 is within a range of threshold voltage values. In some examples, driver 106 may determine current warning information indicating whether current at set of LEDs 108 is within a range of current values. Driver 106 may determine forward voltage warning information indicating whether a forward voltage at one or more of LEDs of the set of LEDs 108 is within a range of forward voltage values. In some examples, driver 106 may determine duty cycle warning information indicating whether a duty cycle for driver 106 is within a range of duty cycle values. Driver 106 may determine short circuit warning information indicating whether an LED string of set of LEDs 108 is electrically connected to another LED string of the set of LEDs. Driver 106 may determine transmission error feedback information indicating whether a corrupted payload has been received by driver 106. In some examples, driver 106 may determine overloaded LED feedback information indicating whether a temperature at driver 106 exceeds a temperature threshold. Driver 106 may determine device fault feedback information indicating whether driver 106 has detected a hardware fault (e.g., a breakdown of a dielectric of driver 106 that electrically connects two different rails).

Driver 106 outputs, on bus 104, the safety information to acknowledge receipt of the write access frame. In this example, controller 102 may control set of LEDs 108 based on the safety information. For example, if the safety information indicates that driver 106 is operating close to a temperature threshold, controller 102 may reduce a current provided by driver 106 to set of LEDs 108.

Figure 2:
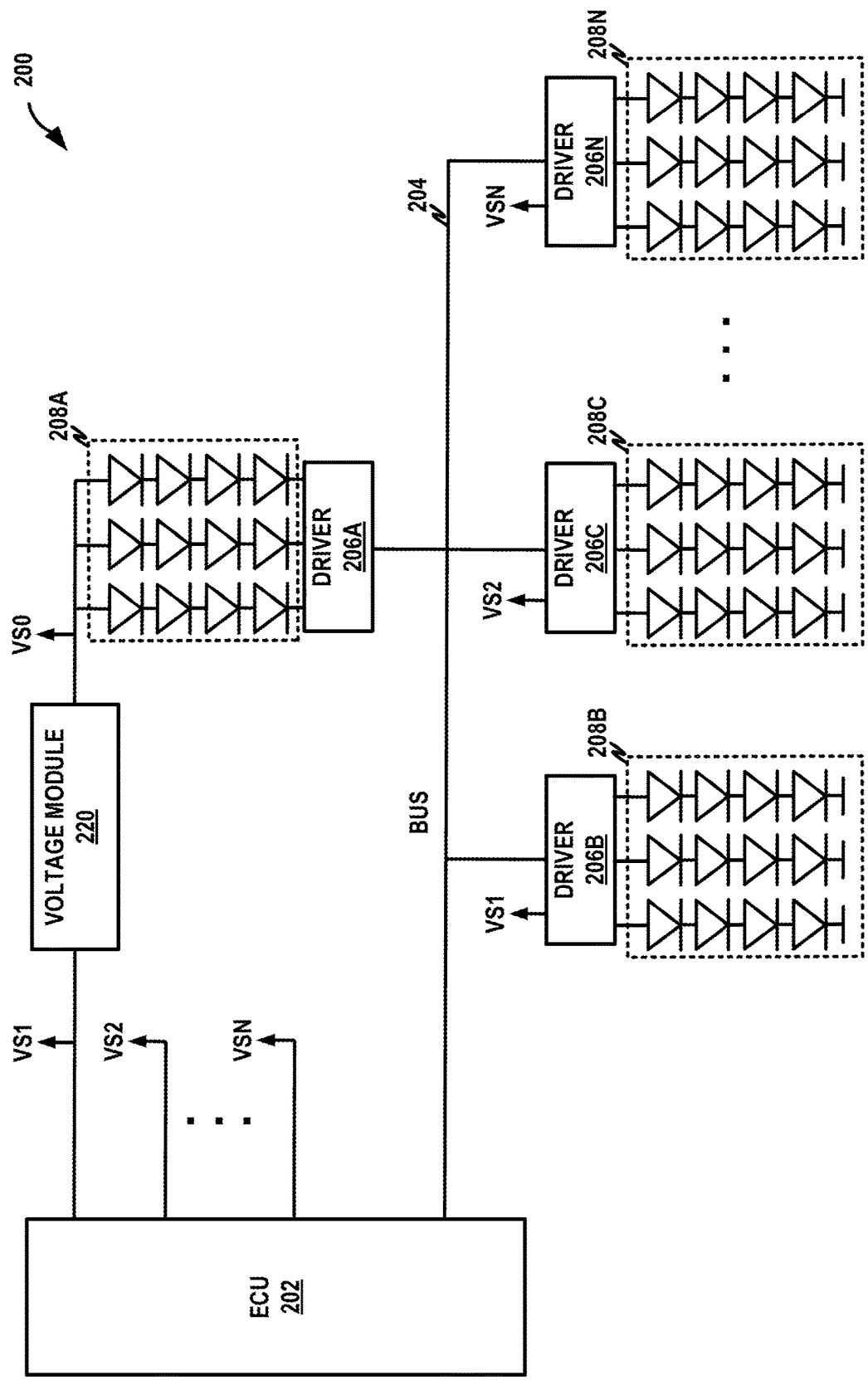
FIG. 2 is a conceptual diagram illustrating a system configured for controlling a plurality of drivers, in accordance with one or more techniques of this disclosure.

FIG. 2 is a conceptual diagram illustrating a system 200 configured for controlling driver 206A-206N (collectively, "drivers 206"), in accordance with one or more techniques of this disclosure. System 200 includes ECU 202, which may be an example of controller 102, and set of LEDs 208A-208N (collectively, "set of LEDs 208"). While the example of FIG. 2 illustrates four driver and set of LED pairs, some examples may include 'n' number of pairs of drivers and set of LEDs, where 'n' is any integer value greater than or equal to 1. Although FIG. 2 illustrates each one of set of LEDs 208 including a set of three LED strings, 'm' number of LED strings may be used in each set of LEDs, where 'm' is any integer value greater than or equal to 1. For example, some example sets of LEDs may include fewer than three strings of LEDs or more than three strings of LEDs.

In the example of FIG. 2, set of LEDs 208 may be each associated with a respective voltage. For instance, set of LEDs 208A may be driven with voltage VS0, set of LEDs 208B may be driven with voltage VS1, set of LEDs 208C may be driven with voltage VS2, and set of LEDs 208N may be driven with voltage VSN. As shown, the respective voltages provided to set of LEDs 208 may be controlled and/or generated by ECU 202 or using voltage module 220. For example, voltage module 220 may comprise a switching power converter (e.g., a buck converter, a boost converter, a auk converter, a buck-boost converter, etc.), a linear regulator, or another voltage module.

For example, set of LEDs 208A may be activated using a voltage VS0 that is different than (e.g., higher or lower) voltage VS1 for set of LEDs 208B. For instance, set of LEDs 208A may include a higher or lower quantity of LEDs than set of LEDs 208B. Additionally, or alternatively, set of LEDs 208A may include a one or more LEDs having a higher forward voltage than LEDs of set of LEDs 208B. In some examples, set of LEDs 208A may have a higher forward voltage than set of LEDs 208B.

Each driver of drivers 206 may control a current supplied to a respective set of LEDs. For example, driver 206A may electrically couple a first node of a string of LEDs of set of LEDs 208A to a reference node (e.g., ground) to activate the string of LEDs, where a second node of the string of LEDs is coupled to a supply node (e.g., VS0). In the example of FIG. 2, driver 206B may electrically couple a first node of a string of LEDs of set of LEDs 208B to a supply node (e.g., VS1) to activate the string of LEDs, where a second node of the string of LEDs is coupled to a reference node (e.g., ground).

Driver 206A may be configured to set brightness information to a set of predetermined brightness levels in response to determining that a communication loss has occurred at driver 206A. For example, in response to driver 206A being disconnected from bus 204 and/or from losing communication with ECU 202, driver 206A may set a current level for each string of LEDs of set of LEDs 208A to a predetermined current level. In some examples, in response to driver 206A being disconnected from bus 204 and/or from losing communication with ECU 202, driver 206A may set a duty cycle for each string of LEDs of set of LEDs 208A to a predetermined duty cycle. While this example refers to driver 206A as setting brightness information to a set of predetermined brightness levels, any combination of one or more of drivers 206 may set the brightness information to a set of predetermined brightness levels in response to a loss of communication with ECU 202.

Driver 206A may be configured to set current to the set of LEDs to correspond to zero current or approximately zero current (e.g., zero current +/−10 µA) in response to determining that an unsafe event has occurred at driver 206A. For example, driver 206A may determine that the unsafe event has occurred based on safety information. The safety information may include undervoltage information, current warning information, forward voltage warning information, duty cycle warning information, short circuit warning information, transmission error feedback information, overloaded LED warning information, and/or device fault feedback information. While this example refers to driver 206A as setting current to set of LEDs 208A to correspond to zero, any combination of one or more of drivers 206 may set current to correspond to zero in response to an unsafe event.

A frame type (e.g., a write access frame or a read access frame) may describe different configuration of frames. Some of the frame types are only for a specific purpose, which is discussed further herein. ECU 202 may generate a write access request frame or a read access request frame and provide address information for a selected driver of drivers 206. Driver 206 may receive every write access request frame and read access request frame and compare the address information to a reference address stored in the device. If the address issued by ECU 202 matches the reference address of the driver, the driver takes action according the write access request or read access request. If the address issued by ECU 202 does not match the reference address of the driver, the driver may ignore the entire frame.

For example, driver 206A may receive an address for a write access frame. In this example, driver 206A may determine whether the received address corresponds to an assigned address of driver 206A. For instance, driver 206A may store an indication of the assigned address of driver 206A and compare the received address with the address stored by driver 206A. In response to determining that the received address corresponds to the assigned address of driver 206A, driver 206A may process the write access frame. For instance, driver 206A may set a brightness of set of LEDs 208A based on brightness information of the write access frame and output safety information on bus 204 as an acknowledgement to the write access frame. In response, however, to determining that the received address does not correspond to the assigned address of driver 206A, driver 206A may refrain from responding to the write access frame. For instance, the received address may instead correspond to an assigned address of driver 206B. In this instance, driver 206B may set a brightness of set of LEDs 208B based on brightness information of the write access frame and output safety information on bus 204 as an acknowledgement to the write access frame.

When setting up a network, each driver connected to the network may be assigned a unique address to avoid bus collisions. One particular servant address may be used to implement a broadcast synchronization feature, which may cause all connected drivers to change a certain configuration at the same point in time. For example, at a first step, ECU 202 may distribute, with individual write access frames, brightness information to all connected drivers on the bus. For instance, ECU 202 may output a first write access frame that includes first brightness information for first set of LEDs 208A and that indicates a first address assigned to driver 206A. In this instance, ECU 202 may output a second write access frame that includes second brightness information for second set of LEDs 208B and that indicates the second address assigned to driver 206B and so forth.

At second step, ECU 202 may send a single broadcast synchronization message to simultaneously synchronize the update event on all of drivers 206. For example, ECU 202 may output an access frame that indicates a synchronization address assigned to broadcast synchronization. In this example, driver 206A may receive, via bus 204, a broadcast synchronization message and control first set of LEDs 208A based on the first brightness information in response to receiving the broadcast synchronization message. For instance, driver 206A may store an indication of the synchronization address and compare the received address with the synchronization address stored by driver 206A. Similarly, driver 206B may receive, via bus 204, the broadcast synchronization message and control second set of LEDs 208B based on the second brightness information in response to receiving the broadcast synchronization message. In this way, system 500 may help to ensure that drivers 206 synchronize control of LEDs 208, which may be particularly important when drivers 206 are used to implement light patterns in sets of LEDs 208.

Figure 3A:
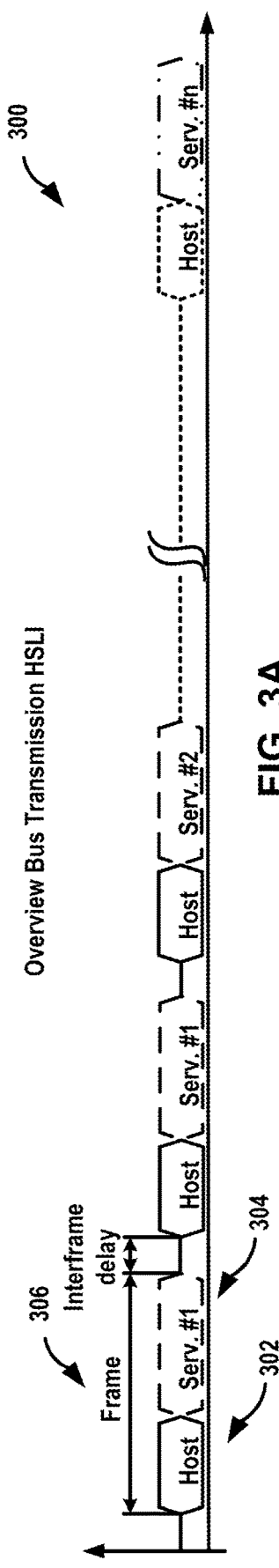
FIG. 3A is a timing diagram of an example overview bus transmission, in accordance with one or more techniques of this disclosure.

FIG. 3A is a timing diagram of an example overview bus transmission 300, in accordance with one or more techniques of this disclosure. An example high-speed lighting interface (HSLI) is a digital interface for high performance automotive applications. In some examples, the interface data link layer may be based on a UART bit stream. The protocol may be designed to support direct device-to-microcontroller connections as well as CAN-FD transceivers to implement a robust connection scheme for remote control applications. In part to a lean protocol implementation, high update rates can be achieved despite limited bandwidth, especially with remote interfaces. As shown, write access frame 306 may not include arbitration information.

Figure 3B:
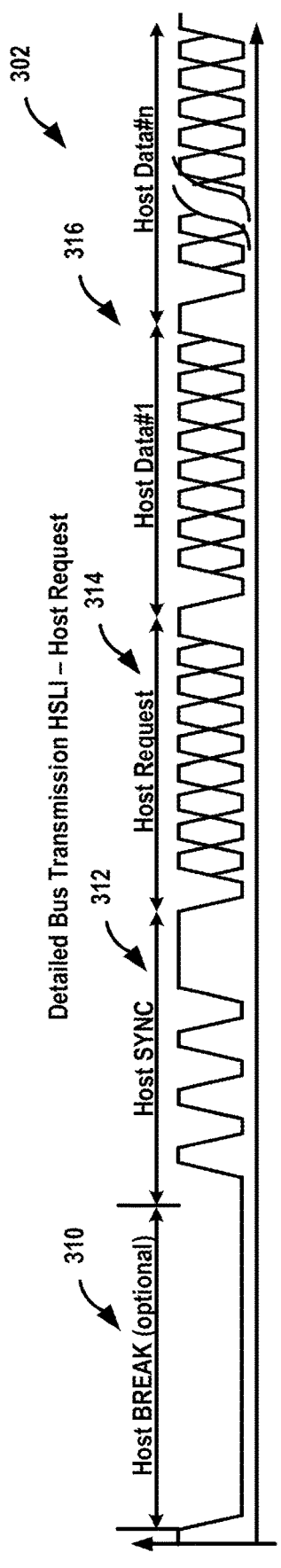
FIG. 3B is a timing diagram of example details of a first portion of the write access frame of FIG. 3A, in accordance with one or more techniques of this disclosure.

FIG. 3B is a timing diagram of example details of a first portion 302 of write access frame 306 of FIG. 3A, in accordance with one or more techniques of this disclosure. In the example of FIG. 3B, first portion 302 of write access frame 306 includes an optional host break 310, one sync byte 312, one host request 314, and 0 to n host data bytes 316.

Figure 3C:
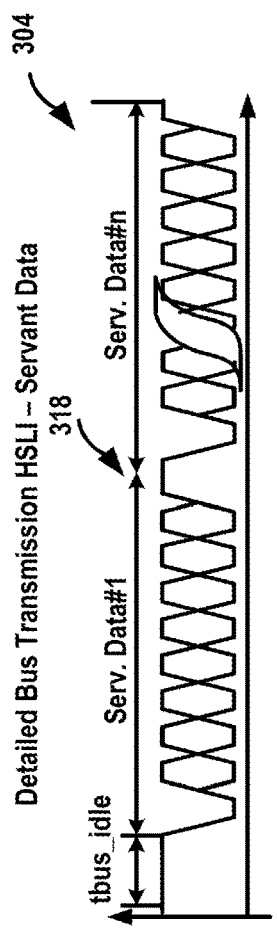
FIG. 3C is a timing diagram of example details of a second portion of the write access frame of FIG. 3A, in accordance with one or more techniques of this disclosure.

FIG. 3C is a timing diagram of example details of a second portion 304 of write access frame 306 of FIG. 3A, in accordance with one or more techniques of this disclosure. As shown, second portion 304 of write access frame 306 includes 0 to n servant data bytes 318.

Figure 4:
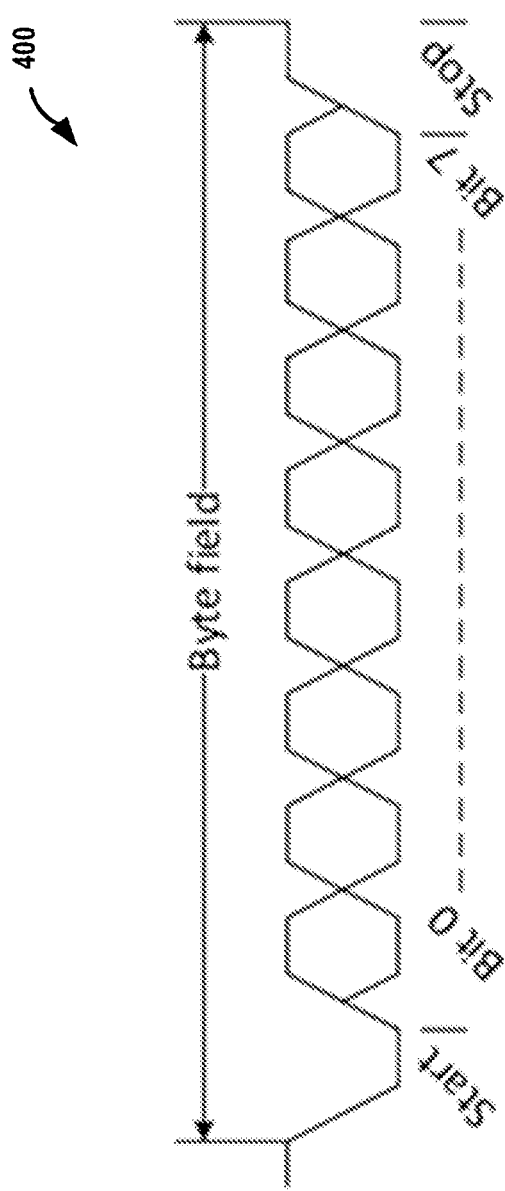
FIG. 4 is a timing diagram of an example data field of a frame, in accordance with one or more techniques of this disclosure.

FIG. 4 is a timing diagram of an example data field 400 of a frame, in accordance with one or more techniques of this disclosure. Data field 400 may be an example of a format for 0 to n servant data bytes 318 of FIG. 3C. Data field 400 may be compliant with a UART byte field. This structure may form a basis for data transfer between servant devices and a host. As shown, a least-significant bit (LSB) of data field 400 may be transmitted first and a most-significant bit (MSB) may be transmitted last. A controller or a driver may encode a start bit as a low and the stop bit as a high bit.

Figure 5:
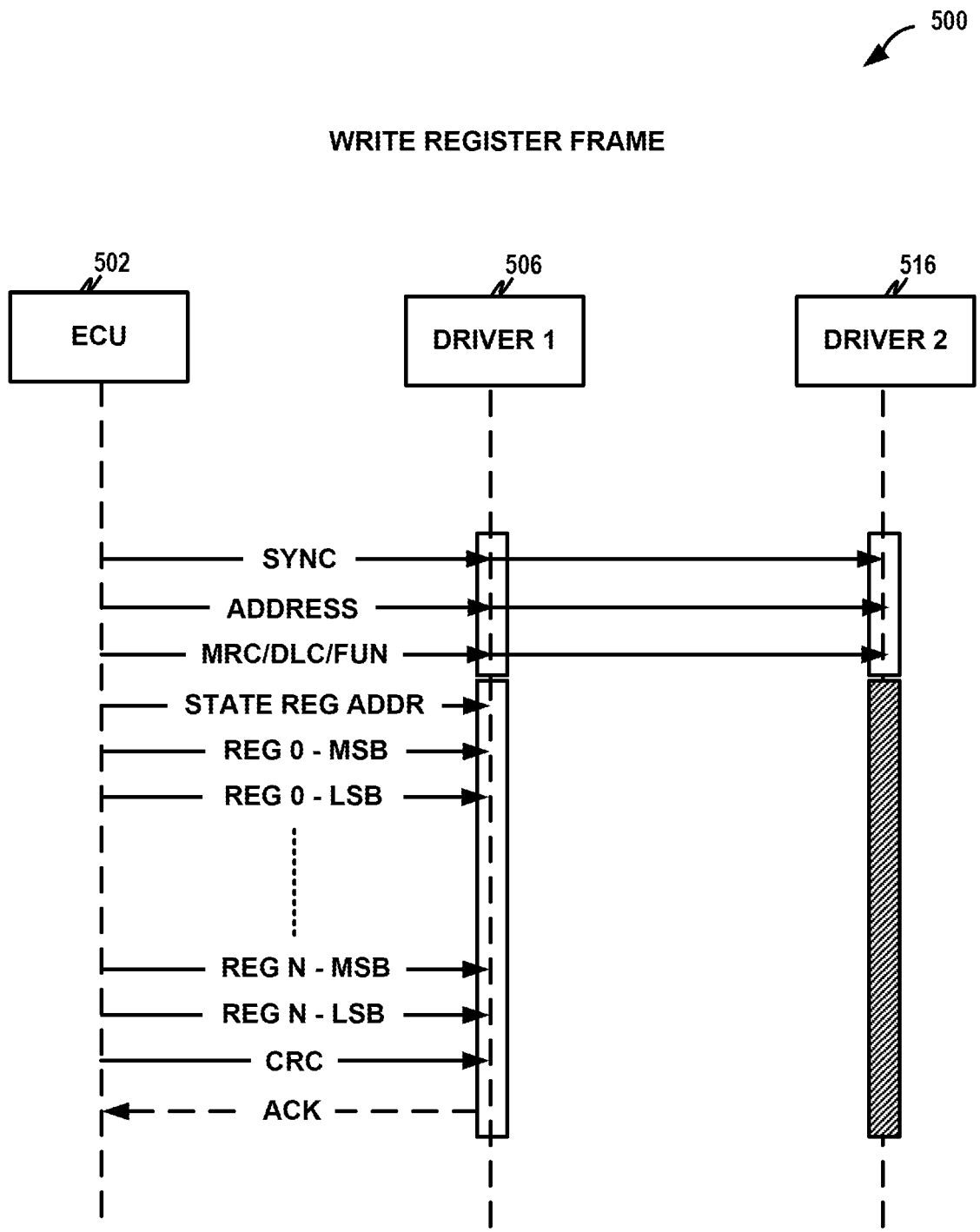
FIG. 5 is an illustration of example process for performing a write operation using a write access frame, in accordance with one or more techniques of this disclosure.

FIG. 5 is an illustration of example process for performing a write operation using a write access frame, in accordance with one or more techniques of this disclosure. FIG. 5 is discussed with reference to FIGS. 1-4 for example purposes only. As shown, system 500 may include ECU 502, which may be an example of controller 102, and driver 506, which may be an example of driver 106. Additionally, system 500 includes driver 516.

In the example of FIG. 5, a write access frame (e.g., a write register frame) is used to transmit data to driver 506 and to retrieve an immediate safety related device status. In this example, the write access frame includes: the sync byte, provided by ECU 502, the address byte, provided by ECU 502, the master rolling counter (MRC), data length code (DLC), and function (FUN) byte, provided by ECU 502, the payload (e.g., REG 0-MSB, REG 0-LSB . . . REG N-MSB, REG N-LSB), provided by ECU 502, the payload CRC (e.g., CRC), provided by ECU 502, and the safety response (e.g., ACK), provided by driver 506. In this example, driver 516 may ignore the write access frame in response to determining that the address byte indicates an address that does not correspond to the address assigned to driver 516.

Figure 6:
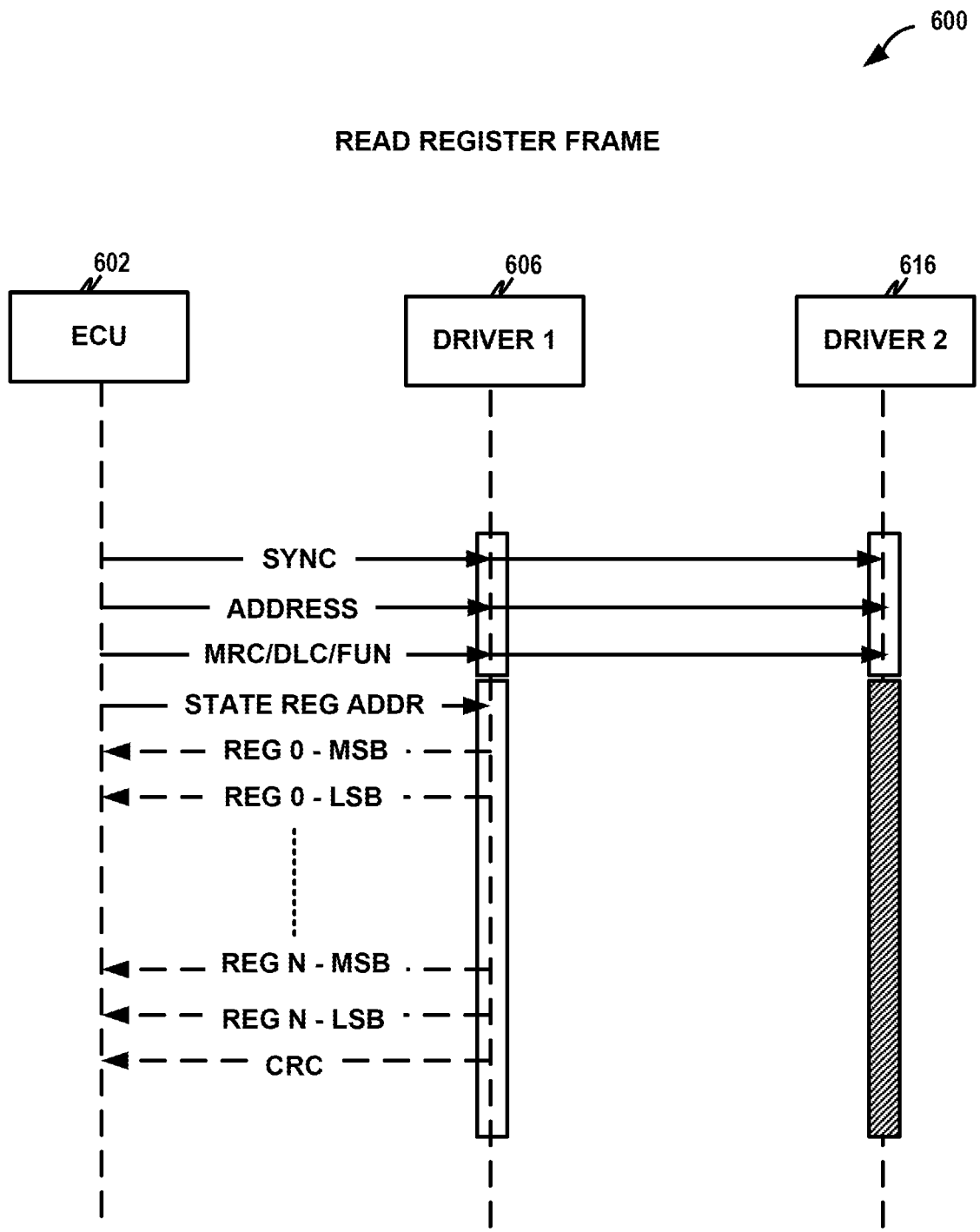
FIG. 6 is an illustration of example process for performing a read operation using a read access frame, in accordance with one or more techniques of this disclosure.

FIG. 6 is an illustration of example process for performing a read operation using a read access frame, in accordance with one or more techniques of this disclosure. FIG. 5 is discussed with reference to FIGS. 1-4 for example purposes only. As shown, system 600 may include ECU 602, which may be an example of controller 102, and driver 606, which may be an example of driver 106. Additionally, system 600 includes driver 616.

In the example of FIG. 6, a read access frame (read register frame) is used to retrieve data from driver 606 including an immediate safety related device status. For example, driver 606 may receive one or more of: a synchronous byte for syncing the driver to the bus, a rolling counter indicating a number of messages sent to the driver via the bus, a message data length code indicating a length in bits of the brightness information, a function code indicating a function of the brightness information, or cyclic redundancy check information for error detecting the brightness information.

In this example, the read access frame includes: the sync byte, provided by the master, the address byte, provided by ECU 602, the master rolling counter (MRC), data length code (DLC), and function (FUN) byte, provided by ECU 602, the payload (e.g., REG 0-MSB, REG 0-LSB . . . REG N-MSB, REG N-LSB), the payload CRC, provided by driver 606, and the safety response, provided by driver 606. For example, in response to the read access frame, driver 606 may output a payload that includes extended diagnostic feedback information. The extended diagnostic feedback information may comprise one or more of a forward voltage for each LED of the set of LEDs or a device temperature at the driver.

Figure 7:
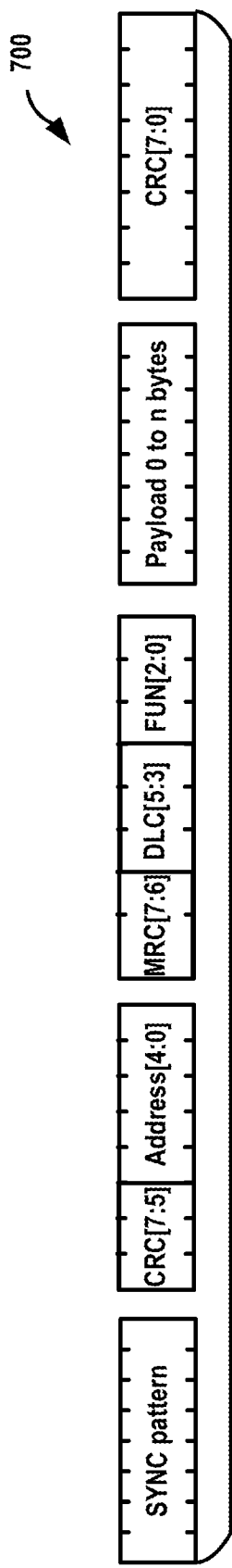
FIG. 7 is a timing diagram of example write access frame for performing a write operation, in accordance with one or more techniques of this disclosure.

FIG. 7 is a timing diagram of example write access frame for performing a write operation, in accordance with one or more techniques of this disclosure. FIG. 7 is discussed with reference to FIGS. 1-6 for example purposes only. As shown, host write request 700 may include a byte for a sync pattern, 3 bits for a CRC, 5 bits for an address, 2 bits for a master rolling counter, 3 bits for a data length code, 3 bits for a function, a payload of 0 to n bytes, and a CRC of 8 bits.

Figure 8:
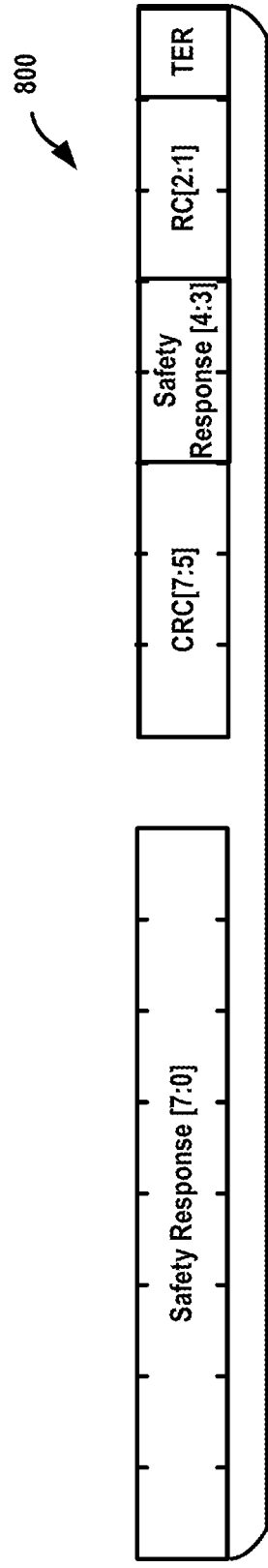
FIG. 8 is a timing diagram of example servant response to a write access frame for performing a write operation, in accordance with one or more techniques of this disclosure.

FIG. 8 is a timing diagram of example servant response 800 to a write access frame for performing a write operation, in accordance with one or more techniques of this disclosure. FIG. 8 is discussed with reference to FIGS. 1-7 for example purposes only. As shown, a servant response 800 may include a byte for a safety response, 3 bits for CRC, 2 bits for a safety response, 2 bits for a response message counter (RC), and 1 bit for transmission error (TER). The 2 bits for a safety response may indicate a device power mode. Examples of a device power mode may include, for example, a low power mode, an active power mode, or a safe state. The 1 bit for TER may indicate whether a fault in the payload CRC has occurred.

FIG. 9 is a timing diagram of example read access frame for performing a read operation, in accordance with one or more techniques of this disclosure. FIG. 9 is discussed with reference to FIGS. 1-8 for example purposes only. As shown, host read request 700 may include a byte for a sync pattern, 3 bits for a CRC, 5 bits for an address, 2 bits for a master rolling counter, 3 bits for a data length code, and 3 bits for a function.

FIG. 10 is a timing diagram of example servant response to a read access frame for performing a read operation, in accordance with one or more techniques of this disclosure. FIG. 10 is discussed with reference to FIGS. 1-9 for example purposes only. As shown, a servant response 1000 may include a payload of 0 to n bytes, a CRC of 8 bits, a byte for a safety response, 3 bits for CRC, 2 bits for a safety response, 2 bits for a response message counter (RC), and 1 bit for TER.

The end-to-end protection to support automotive safety integrity level (ASIL) requirements may be provided via message counters for the request (MRC) and response (RC) and CRCs for the master request, payload and servant response. Consequently, the example frames of FIGS. 7-10 may support following functional failure modes, which may provide compliance support for ISO/FDIS 26262-5:2018: Annex D, Table D.1, D.6-Communication bus (serial, parallel). Examples of failure modes are shown in Table 1.

TABLE 1

| Failure mode Description | comment |
| --- | --- |
| Message corruption | CRC |
| Message unacceptable delay | Master-slave with immediate feedback |
| Message loss | Master-slave with immediate feedback and message counter |
| Unintended message repetition | master/slave message counter |
| Incorrect sequencing of messages | master/slave message counter |
| Message insertion | master/slave with SYNC pattern, CRC and message counter |
| Message masquerading | CRC |
| Message incorrect addressing | CRC |

In accordance with the techniques of the disclosure, a system may be configured with a bus configured to receive an access frame (e.g., a write access frame or a read access frame) and safety information as an acknowledgement without a bus arbitration due to the host/servant approach. This may help to reduce bus signal integrity and timing requirements for the servant nodes. Moreover a leading SYNC byte may allow a clock frequency recovery by the servant devices. This may help to enable significant system cost reductions in saving external quartz (e.g., crystal) components and leads to less testing as well as calibration efforts. Techniques described herein for configuring a system to use an access frame and safety information may help to provide a low overhead and a robust protocol that may support ASIL requirements. Techniques described herein for configuring a system to use an access frame and safety information may allow for an immediate servant response of safety related feedback to offload network utilization.

Figure 11:
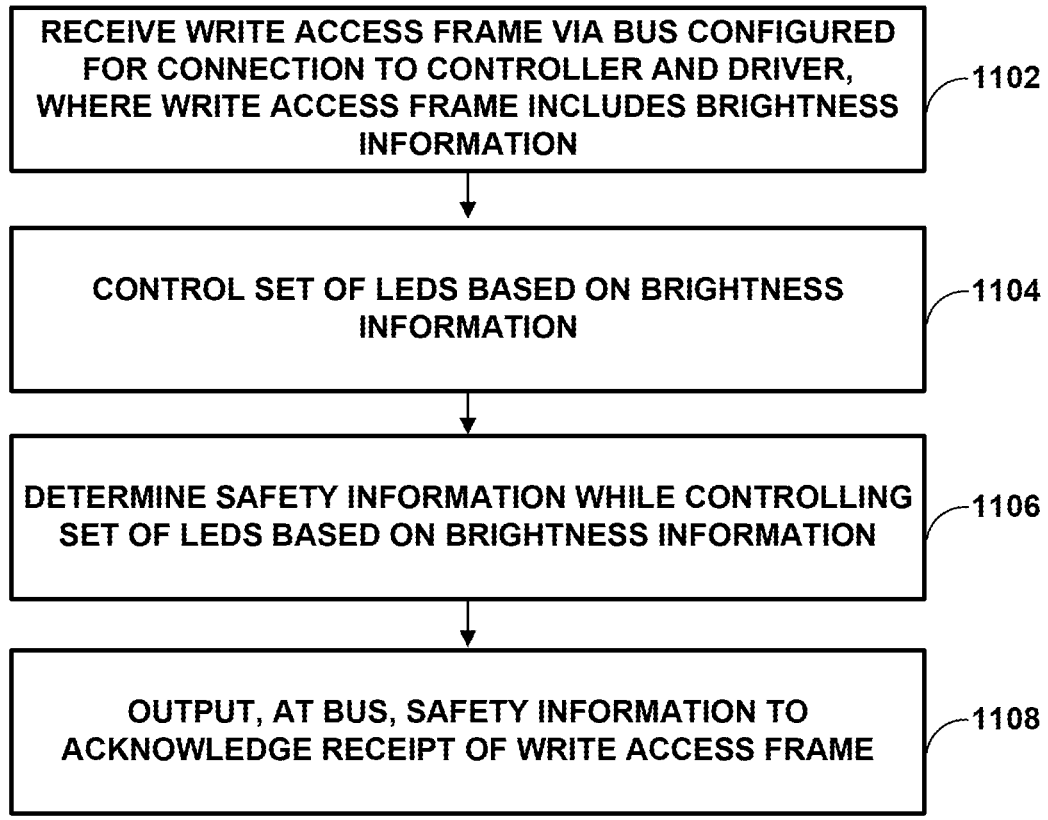
FIG. 11 is a flow diagram consistent with techniques that may be performed by the example system of FIG. 1, in accordance with this disclosure.

FIG. 11 is a flow diagram consistent with techniques that may be performed by the example system of FIG. 1, in accordance with this disclosure. FIG. 11 is discussed with reference to FIGS. 1-10 for example purposes only although the techniques of FIG. 11 may be used with other systems or devices.

In accordance with one or more techniques of this disclosure, driver 106 may receive a write access frame via a bus configured for connection with a controller and the driver, where the write access frame includes brightness information (1102). For example, the brightness information may indicate a respective current through each string of a plurality of strings of LEDs of set of LEDs 108. In some examples, the brightness information indicates a respective duty cycle for supplying current through each string of a plurality of strings of LEDs of set of LEDs 108.

Driver 106 may control a set of LEDs based on the brightness information (1104). For example, driver 106 may provide the respective current through each string of the plurality of strings of LEDs of set of LEDs 108 that is indicated by the brightness information. In some examples, driver 106 may provide, at each string of the plurality of strings of LEDs of set of LEDs 108, current with the respective duty cycle that is indicated by brightness information.

Driver 106 may determine safety information while controlling the set of LEDs based on the brightness information (1106). Driver 106 may output, at bus 104, the safety information to acknowledge receipt of the write access frame (1108). For example, the safety information may include undervoltage information, current warning information, forward voltage warning information, duty cycle warning information, short circuit warning information, transmission error feedback information, overloaded LED warning information, and/or device fault feedback information.

The following examples may illustrate one or more aspects of the disclosure.

Example 1. A method for driving a set of LEDs, the method comprising: receiving a write access frame by a driver via a bus configured for connection with a controller and the driver, wherein the write access frame includes brightness information; controlling, by the driver, the set of LEDs based on the brightness information; determining, by the driver, safety information while controlling the set of LEDs based on the brightness information; and outputting, by the driver and at the bus, the safety information to acknowledge receipt of the write access frame.

Example 2. The method of example 1, wherein the safety information comprises one or more of: undervoltage information indicating whether a voltage at the set of LEDs is within a range of threshold voltage values; current warning information indicating whether current at the set of LEDs is within a range of current values; forward voltage warning information indicating whether a forward voltage at one or more of LEDs of the set of LEDs is within a range of forward voltage values; duty cycle warning information indicating whether a duty cycle for the driver is within a range of duty cycle values; short circuit warning information indicating whether an LED string of the set of LEDs is electrically connected to another LED string of the set of LEDs; transmission error feedback information indicating whether a corrupted payload has been received by the driver; overloaded LED feedback information indicating whether a temperature at the driver exceeds a temperature threshold; or device fault feedback information indicating whether the driver has detected a hardware fault.

Example 3. The method of any combination of examples 1-2, wherein the brightness information indicates a respective current through each string of a plurality of strings of LEDs of the set of LEDs; and wherein controlling the set of LEDs comprises providing the respective current through each string of the plurality of strings of LEDs.

Example 4. The method of any combination of examples 1-3, wherein the brightness information indicates a respective duty cycle for supplying current through each string of a plurality of strings of LEDs of the set of LEDs; and wherein controlling the set of LEDs comprises providing, at each string of the plurality of strings of LEDs, current with the respective duty cycle.

Example 5. The method of any combination of examples 1-4, further comprising setting, by the driver, the brightness information to a set of predetermined brightness levels in response to determining that a communication loss has occurred at the driver.

Example 6. The method of any combination of examples 1-5, further comprising setting, by the driver, current to the set of LEDs to correspond to zero in response to determining that an unsafe event has occurred at the driver.

Example 7. The method of any combination of examples 1-6, wherein receiving the write access frame comprises receiving an address, the method further comprising determining, by the driver, that the received address corresponds to an assigned address of the driver.

Example 8. The method of any combination of examples 1-7, further comprising: receiving, by the driver and via the bus, a broadcast synchronization message for the brightness information; and wherein controlling the set of LEDs based on the brightness information is in response to receiving the broadcast synchronization message.

Example 9. The method of any combination of examples 1-8, wherein the write access frame is a first write access frame, the method further comprising: in response to receiving, via the bus, an address for a second write access frame that does not correspond to an assigned address of the driver, refraining, by the driver, from responding to the second access frame.

Example 10. The method of any combination of examples 1-9, wherein the write access frame is transmitted from the controller unit and wherein the write access frame does not include arbitration information.

Example 11. The method of any combination of examples 1-10, wherein receiving the write access frame comprises receiving one or more of: a synchronous byte for syncing the driver to the bus; a rolling counter indicating a number of messages sent to the driver via the bus; a message data length code indicating a length in bits of the brightness information; a function code indicating a function of the brightness information; or cyclic redundancy check information for error detecting the brightness information.

Example 12. The method of any combinations of examples 1-11, further comprising: receiving, by the driver and via the bus, a read access frame while the driver controls the set of LEDs based on the brightness information; and in response to receiving the read access frame, outputting, by the driver and at the bus, extended diagnostic feedback information.

Example 13. The method of example 12, wherein the extended diagnostic feedback information comprises one or more of a forward voltage for each LED of the set of LEDs or a device temperature at the driver.

Example 14. The method of any combination of examples 1-13, wherein the driver is a first driver and wherein the bus is further configured for connection with a second driver.

Example 15. A device for driving a set of LEDs, the device comprising a driver configured to: receive a write access frame via a bus configured for connection with a controller and the driver, wherein the write access frame includes brightness information; control the set of LEDs based on the brightness information; determine safety information while controlling the set of LEDs based on the brightness information; and output, at the bus, the safety information to acknowledge receipt of the write access frame.

Example 16. The device of example 15, wherein the safety information comprises one or more of: undervoltage information indicating whether a voltage at the set of LEDs is within a range of threshold voltage values; current warning information indicating whether current at the set of LEDs is within a range of current values; forward voltage warning information indicating whether a forward voltage at one or more of LEDs of the set of LEDs is within a range of forward voltage values; duty cycle warning information indicating whether a duty cycle for the driver is within a range of duty cycle values; short circuit warning information indicating whether an LED string of the set of LEDs is electrically connected to another LED string of the set of LEDs; transmission error feedback information indicating whether a corrupted payload has been received by the driver; overloaded LED feedback information indicating whether a temperature at the driver exceeds a temperature threshold; or device fault feedback information indicating whether the driver has detected a hardware fault.

Example 17. The device of any combination of examples 15-16, wherein the brightness information indicates a respective current through each string of a plurality of strings of LEDs of the set of LEDs; and wherein, to control the set of LEDs, the driver is configured to provide the respective current through each string of the plurality of strings of LEDs.

Example 18. The device of any combination of examples 15-17, wherein the brightness information indicates a respective duty cycle for supplying current through each string of a plurality of strings of LEDs of the set of LEDs; and wherein, to control the set of LEDs, the driver is configured to provide, at each string of the plurality of strings of LEDs, current with the respective duty cycle.

Example 19. The device of any combination of examples 15-18, wherein, to receive the write access frame, the driver is configured to receive an address and wherein the driver is further configured to determine that the received address corresponds to an assigned address of the driver.

Example 20. A system for controlling LEDs, the system comprising: an ECU; a driver configured to drive a set of LEDs; a bus configured for connection with the ECU and the driver; wherein the ECU is configured to output a write access frame at the bus, the write access frame including brightness information; wherein the driver is configured to: receive the write access frame via the bus; control the set of LEDs based on the brightness information of the write access frame; determine safety information while controlling the set of LEDs based on the brightness information of the write access frame; and output, at the bus, the safety information to acknowledge receipt of the write access frame.

Various aspects have been described in this disclosure. These and other aspects are within the scope of the following claims.

The invention claimed is:

1. A method for driving a set of light emitting diodes (LEDs), the method comprising:
receiving a write access frame by a driver via a bus configured for connection with a controller and the driver, wherein the write access frame includes brightness information;
controlling, by the driver, the set of LEDs based on the brightness information;
determining, by the driver, safety information while controlling the set of LEDs based on the brightness information; and
outputting, by the driver and at the bus, the safety information to acknowledge receipt of the write access frame.

2. The method of claim 1, wherein the safety information comprises one or more of:
undervoltage information indicating whether a voltage at the set of LEDs is within a range of threshold voltage values;
current warning information indicating whether current at the set of LEDs is within a range of current values;
forward voltage warning information indicating whether a forward voltage at one or more of LEDs of the set of LEDs is within a range of forward voltage values;
duty cycle warning information indicating whether a duty cycle for the driver is within a range of duty cycle values;
short circuit warning information indicating whether an LED string of the set of LEDs is electrically connected to another LED string of the set of LEDs;
transmission error feedback information indicating whether a corrupted payload has been received by the driver;
overloaded LED feedback information indicating whether a temperature at the driver exceeds a temperature threshold; or
device fault feedback information indicating whether the driver has detected a hardware fault.

3. The method of claim 1,
wherein the brightness information indicates a respective current through each string of a plurality of strings of LEDs of the set of LEDs; and
wherein controlling the set of LEDs comprises providing the respective current through each string of the plurality of strings of LEDs.

4. The method of claim 1,
wherein the brightness information indicates a respective duty cycle for supplying current through each string of a plurality of strings of LEDs of the set of LEDs; and wherein controlling the set of LEDs comprises providing, at each string of the plurality of strings of LEDs, current with the respective duty cycle.

5. The method of claim 1, further comprising setting, by the driver, the brightness information to a set of predetermined brightness levels in response to determining that a communication loss has occurred at the driver.

6. The method of claim 1, further comprising setting, by the driver, current to the set of LEDs to correspond to zero in response to determining that an unsafe event has occurred at the driver.

7. The method of claim 1, wherein receiving the write access frame comprises receiving an address, the method further comprising determining, by the driver, that the received address corresponds to an assigned address of the driver.

8. The method of claim 1, further comprising:
receiving, by the driver and via the bus, a broadcast synchronization message for the brightness information; and
wherein controlling the set of LEDs based on the brightness information is in response to receiving the broadcast synchronization message.

9. The method of claim 1, wherein the write access frame is a first write access frame, the method further comprising:
in response to receiving, via the bus, an address for a second write access frame that does not correspond to an assigned address of the driver, refraining, by the driver, from responding to the second access frame.

10. The method of claim 1, wherein the write access frame is transmitted from the controller unit and wherein the write access frame does not include arbitration information.

11. The method of claim 1, wherein receiving the write access frame comprises receiving one or more of:
a synchronous byte for syncing the driver to the bus;
a rolling counter indicating a number of messages sent to the driver via the bus;
a message data length code indicating a length in bits of the brightness information;
a function code indicating a function of the brightness information; or
cyclic redundancy check information for error detecting the brightness information.

12. The method of claim 1, further comprising:
receiving, by the driver and via the bus, a read access frame while the driver controls the set of LEDs based on the brightness information; and
in response to receiving the read access frame, outputting, by the driver and at the bus, extended diagnostic feedback information.

13. The method of claim 12, wherein the extended diagnostic feedback information comprises one or more of a forward voltage for each LED of the set of LEDs or a device temperature at the driver.

14. The method of claim 1, wherein the driver is a first driver and wherein the bus is further configured for connection with a second driver.

15. A device for driving a set of light emitting diodes (LEDs), the device comprising a driver configured to:
receive a write access frame via a bus configured for connection with a controller and the driver, wherein the write access frame includes brightness information;
control the set of LEDs based on the brightness information;
determine safety information while controlling the set of LEDs based on the brightness information; and
output, at the bus, the safety information to acknowledge receipt of the write access frame.

16. The device of claim 15, wherein the safety information comprises one or more of:
undervoltage information indicating whether a voltage at the set of LEDs is within a range of threshold voltage values;
current warning information indicating whether current at the set of LEDs is within a range of current values;
forward voltage warning information indicating whether a forward voltage at one or more of LEDs of the set of LEDs is within a range of forward voltage values;
duty cycle warning information indicating whether a duty cycle for the driver is within a range of duty cycle values;
short circuit warning information indicating whether an LED string of the set of LEDs is electrically connected to another LED string of the set of LEDs;
transmission error feedback information indicating whether a corrupted payload has been received by the driver;
overloaded LED feedback information indicating whether a temperature at the driver exceeds a temperature threshold; or
device fault feedback information indicating whether the driver has detected a hardware fault.

17. The device of claim 15,
wherein the brightness information indicates a respective current through each string of a plurality of strings of LEDs of the set of LEDs; and
wherein, to control the set of LEDs, the driver is configured to provide the respective current through each string of the plurality of strings of LEDs.

18. The device of claim 15,
wherein the brightness information indicates a respective duty cycle for supplying current through each string of a plurality of strings of LEDs of the set of LEDs; and
wherein, to control the set of LEDs, the driver is configured to provide, at each string of the plurality of strings of LEDs, current with the respective duty cycle.

19. The device of claim 15, wherein, to receive the write access frame, the driver is configured to receive an address and wherein the driver is further configured to determine that the received address corresponds to an assigned address of the driver.

20. A system for controlling a set of light emitting diodes (LEDs), the system comprising:
an electronic control unit (ECU);
a driver configured to drive the set of LEDs;
a bus configured for connection with the ECU and the driver;
wherein the ECU is configured to output a write access frame at the bus, the write access frame including brightness information;
wherein the driver is configured to:
receive the write access frame via the bus;
control the set of LEDs based on the brightness information of the write access frame;
determine safety information while controlling the set of LEDs based on the brightness information of the write access frame; and
output, at the bus, the safety information to acknowledge receipt of the write access frame.

* * * * *